United States Patent [19]

Smith

[11] Patent Number: 5,118,946

[45] Date of Patent: Jun. 2, 1992

[54] CIRCUIT FOR INTERFACING CRYOGENIC DETECTOR ARRAY WITH PROCESSING CIRCUIT

[75] Inventor: Roy A. Smith, Redondo Beach, Calif.

[73] Assignee: Grumman Aerospace Corporation, Bethpage, N.Y.

[21] Appl. No.: 653,179

[22] Filed: Feb. 11, 1991

Related U.S. Application Data

[63] Continuation-in-part of Ser. No. 607,310, Oct. 31, 1990, abandoned.

[51] Int. Cl.⁵ .............................................. G01J 5/06
[52] U.S. Cl. .................................. 250/352; 250/332; 250/349
[58] Field of Search ................ 250/352, 332, 349, 330

[56] References Cited

U.S. PATENT DOCUMENTS

| | | | |
|---|---|---|---|
| 4,255,658 | 3/1981 | Hurst | 250/332 |
| 4,338,627 | 7/1982 | Stapleton | 250/332 |
| 4,423,325 | 12/1983 | Foss | 250/332 |
| 4,810,978 | 3/1989 | Sato et al. | 250/332 |

*Primary Examiner*—Carolyn E. Fields
*Attorney, Agent, or Firm*—Stetina and Brunda

[57] ABSTRACT

A circuit for coupling infrared detector elements maintained in the cryogenic environment with a processing circuit maintained at a substantially higher temperature is disclosed. The circuit comprises a detector output sampling/comparing circuit electrically connectable to an associated detector element. The sampling/comparing circuit is disposable in a cryogenic environment along with the associated detector element. The circuit is constructed to receive power from a power source that is electrically and thermally isolated from the sampling/comparing circuit. The output of the sampling/comparing circuit being communicatable to a processing circuit while remaining electrically and thermally isolated therefrom.

28 Claims, 2 Drawing Sheets

CIRCUIT FOR INTERFACING CRYOGENIC DETECTOR ARRAY WITH PROCESSING CIRCUIT

This is a continuation-in-part of copending application Ser. No. 7/607/310 filed on Oct. 31, 1990, now abandoned.

The present invention relates to infrared detection circuits and, more particularly, to a circuit for communicating signals from infrared detector elements to processing circuitry that is electrically and thermally isolated from the detector elements.

BACKGROUND OF THE INVENTION

The infrared spectrum covers a range of wavelengths longer than the visible wavelengths but shorter than microwave wavelengths. Visible wavelengths are generally regarded as between 0.4 and 0.75 micrometers. The near infrared wavelengths extend from 0.75 micrometers to 10 micrometers. The far infrared wavelengths cover the range from approximately 10 micrometers to 1 millimeter. The function of infrared detectors is to respond to energy of a wavelength within some particular portion of the infrared region.

Heated objects will dissipate thermal energy having characteristic wavelengths within the infrared spectrum. Different levels of thermal energy, corresponding to different sources of heat, are characterized by the emission of signals within different portions of the infrared frequency spectrum. Different levels of thermal energy, corresponding to different sources of heat, are characterized by the emission of signals within different portions of the infrared frequency spectrum. No single detector is uniformly efficient over the entire infrared frequency spectrum. Thus, detectors are selected in accordance with their sensitivity in the range of interest to the designer. Similarly, electronic circuitry that receives and processes the signals from the infrared detector must also be selected in view of the intended detection function.

A variety of different types of infrared detectors have been proposed in the art since the first crude infrared detector was constructed in the early 1800's. Virtually all contemporary infrared detectors are solid state devices constructed of materials that respond to infrared frequency energy in one of several ways. These include thermal detectors, photovoltaic detectors, and photoconductive detectors.

Thermal detectors respond to infrared energy detectors by absorbing that energy causing an increase in temperature of the detecting material. The increased temperature in turn causes some other property of the material, such as resistivity, to change. By measuring this change the infrared radiation is measured.

Photo-type detectors (e.g., photoconductive and photovoltaic detectors) absorb the infrared frequency energy directly into the electronic structure of the material, inducing an electronic transition which, in turn, leads to either a change in the electrical conductivity (photoconductors) or to the generation of an output voltage across the terminals of the detector (photovoltaic detectors). The precise change that is effected is a function of various factors including the particular detector material selected, the doping density of that material and the detector area.

By the late 1800's, infrared detectors had been developed that could detect the heat from an animal at one quarter of a mile. The introduction of focusing lenses constructed of materials transparent to infrared frequency energy, as well as advances in semiconductor materials and highly sensitive electronic circuitry have advanced the performance of contemporary infrared detectors close to the ideal photon limit.

Current infrared detection systems incorporate arrays of large numbers of discrete, highly sensitive detector elements, the outputs of which are connected to sophisticated processing circuitry. By rapidly analyzing the pattern and sequence of detector element excitation, the processing circuitry can identify and monitor sources of infrared radiation. Though the theoretical performance of such systems is satisfactory for many applications, it is difficult to actually construct structures that mate a million or more detector elements and associated circuitry in a reliable and practical manner. Consequently, practical applications for contemporary infrared detection systems have necessitated that further advances be made in areas such as miniaturization of the detector array and accompanying circuitry, minimization of noise intermixed with the electrical signal generated by the detector elements, and improvements in the reliability and economical production of the detector array and accompanying circuitry.

Further difficulties are associated with conventional infrared detection systems designed for orbital use. Temperatures in space are extremely low. Though the detector elements may be designed to operate in a cryogenic environment, economic considerations may dictate that the associated processing circuitry operate in a higher temperature environment. The semiconductive materials and other elements incorporated into the processing circuit are typically more suited for room temperature operation. Where the detector circuitry is directly connected to the processing circuitry it is difficult to thermally isolate the cryogenic detector circuit from the room temperature processing circuitry. Connections communicating the signal interfaces, power supply connections and other physical interconnections, typically effected by wires or metalized patterns, conduct heat and thereby transfers thermal conditions between the detector circuit and the processing circuitry. Moreover, such connections result in undesirable communication of noise and other transient signals between the detector circuit and the processing circuitry.

Accordingly, the present invention is directed to a circuit for interfacing detector elements with the processing circuitry, while isolating the detector elements and the related interface circuitry from the room temperature processing circuit.

SUMMARY OF THE INVENTION

A circuit is disclosed for coupling infrared detector elements maintained in the cryogenic environment with a processing circuit potentially maintained at a substantially higher temperature. In one embodiment the circuit comprises a detector output sampling/comparing circuit electrically connectable to an associated detector element. The sampling/comparing circuit is disposable in a cryogenic environment along with the associated detector element. The circuit is constructed to receive power from a power source that is electrically and thermally isolated from the sampling/comparing circuit. The output of the sampling/comparing circuit being communicatable to a processing circuit while remaining electrically and thermally isolated therefrom.

A plurality of said detector output sampling/comparing circuits may be provided, each connectable to a dedicated detector element. Such circuits are operative to receive and store signals generated by the detector associated element.

The sampling/comparing circuit is operative to compare the storage signals with the reference signal, and to generate an output signal when a predetermined relationship is established between the storage signal and the reference signal. The reference signal may be a time varying signal and the output signal is representative of the peak value of the detector output during a sampling period. The sampling/comparing circuit is operative to generate an output signal when the reference signal exceeds the storage signal.

The reference signal has a start time and the amplitude of the stored signal is represented by the time between the start time and time at which the output signal is generated. The output signal may be optically communicated to a photodetector in electrical communication with the processing circuit. Consequently, the processing circuit remains electrically and thermally isolated from the sampling/comparing circuit. A plurality of detector sampling/comparing circuits are utilized, with each circuit being operative to generate an optical output signal having a distinct characteristic wavelength. Each such wavelength being distinguishable by the processing circuit.

It is further contemplated that the reference signal may be generated by a reference signal source, such as a light source, that remains electrically and thermally isolated from the sampling/comparing circuit. The power source for the sampling/comparing circuit may also comprise a light source that is optically coupled to said sampling/comparing circuit.

In a second embodiment the circuitry connected to the infrared detector elements is simplified and the output signal is in the form of a liquid crystal display which is optically focused on photodetector elements connected to the output processing. The alternate disembodiment utilizes a lower power input circuit to drive the LCD that optically communicates with the output processing circuit.

In accordance with this embodiment of the present invention the desired isolation of detector mounting structure from back focal plane electronics can be achieved without the use of switching time as the indicator of signal from a given detector. This embodiment may utilize liquid crystal elements that individually modulate the reflectivity of small area display elements, each representing the signal received by an associated driving detector element. The reflected image may be imaged (using imaging optics) on room temperature detectors connected to the processing circuitry. The use of extremely low dissipation of liquid crystal elements has the advantage that the electrical drive characteristic is that of the capacitor typically used to integrate IR detector output, thereby using all received signal which arrives continuously.

DETAILED DESCRIPTION OF THE PRESENTLY PREFERRED EMBODIMENT

The detailed description set forth below is intended merely as a description of the presently preferred embodiment of the invention, and is not intended to represent the only form in which the present invention may be constructed or utilized. The description below sets forth the functions and sequence of signals that are effected by the invention in accordance with the illustrated embodiment. It is to be understood, however, that the same or equivalent functions or signal sequences may be accomplished by different embodiments that are also intended to be encompassed within the spirit and scope of the invention.

Figure 1:
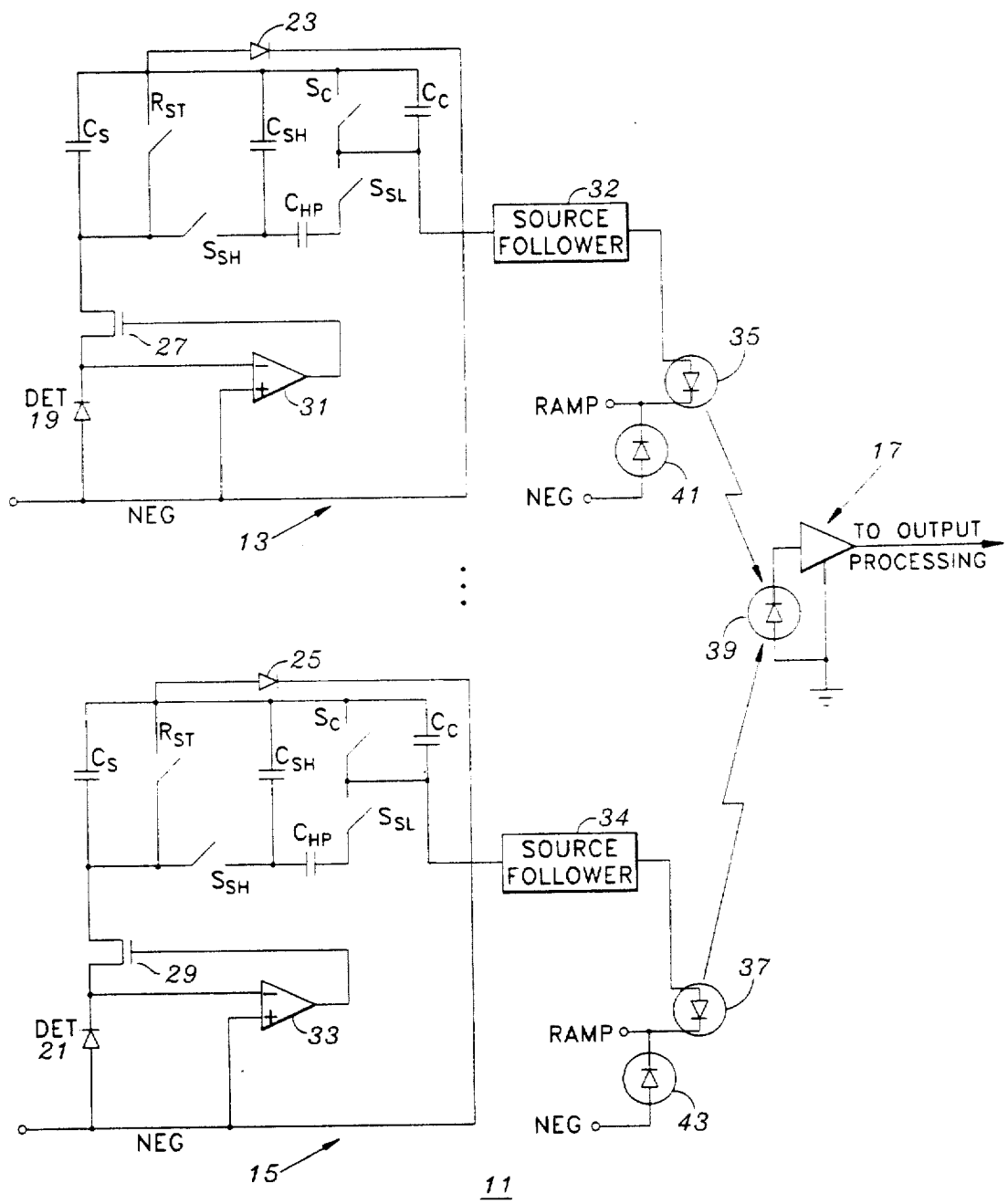
FIG. 1 is a schematic representation of a circuit constructed in accordance with the present invention.

FIG. 1 of the drawings illustrates a circuit 11 formed in accordance with the present invention. The circuit includes detector sampling/comparing circuits 13 and 15, which are in communication with input circuit 17 connected to the processing electronics. The sampling/comparing circuits 13 and 15 are each connectable to a dedicated detector element 19, 21, respectively.

In implementation the sampling/comparing circuits 13, 15 may be repeated hundreds or thousands of times to accommodate the size of the detector array. The sampling/comparing circuits 13 and 15 may be incorporated into integrated circuits, each including a plurality of sampling/comparing circuits, mounted on substrates that are in electrical communication with the detector elements. The assemblies of detector subarrays and interconnected substrates may form detector modules which are disposed in adjacent, abutting relationship. Each module may in turn be in communication with the processing circuitry. The construction of such modules is well known in the art and is disclosed in the following references:

3,582,714 CARSON ET AL.
3,970,990 CARSON ET AL.
4,283,755 TRACY
4,304,624 CARSON ET AL.
4,352,715 CARSON ET AL.
4,354,107 CARSON ET AL.
4,103,238 CLARK
4,525,921 CARSON ET AL.
4,551,629 CARSON ET AL.
4,592,029 ALTMAN ET AL.
4,618,763 SCHMITZ
4,646,128 CARSON ET AL.
4,659,931 SCHMITZ
4,675,532 CARSON
4,672,937 CARSON ET AL.

The teachings of the above-cited references are incorporated herein by reference.

Though such modules may be formed to operate in cryogenic environments, the associated processing circuitry include elements that are best suited to operating in an environment wherein the temperature is substantially in excess of cryogenic temperatures. The present invention is directed to an interface circuit which may be incorporated in such modules or otherwise be used to interface such modules with processing circuitry that is electrically and thermally isolated from the cryogenic environment.

The sampling/comparing circuits 13 and 15 operate as follows. The circuits 13, 15 are powered by means of solar energy or by a light source disposed adjacent the solar cells. Consequently, the circuit is thermally and electrically isolated from any electrical power source operating the processing circuitry.

Detector elements 19 and 21 are biased by transistors 27, 29 and offset stabilizing amplifiers 31, 33. The circuits are initialized by closing the start switches $R_{ST}$. The output from the detector elements are sampled when the sample and hold switches $S_{SH}$ and $S_{SL}$ are closed. Capacitors $C_C$ are charged by closing switches $S_{SL}$ at the same time that switches $S_{SH}$ and $S_{SL}$ a charge is placed on capacitors $C_C$ and $C_{HP}$. That charge closely follows and is proportional to the integral of the detector output current. Source follower circuits 32, 34 produce an output which closely follows the output of the detectors 19, 21. The source follower output is effectively compared to a reference signal, designated RAMP. The RAMP signal is connected to a comparitor circuit that drives light emitting diodes (LED's) 35, 37. The LED's will not generate an output light signal until such time as the RAMP signal exceeds the output signal from the source followers. At that time the LED's 35, 37 operate to generate a light signal that is communicated to photo detector 39, which forms a portion of the processing circuitry 17.

In order to further isolate the sampling/comparing circuit from the processing circuitry the RAMP signal may be generated external to the sampling/comparing circuitry and optically communicated to the circuit, thereby enhancing electrical and thermal isolation of the circuit. As shown at FIG. 1 the RAMP signal may be communicated to the LED's via photodiodes 41, 43 which are in electrical communication with the LED's 35, 37, respectively.

The RAMP signal is preferably implemented as a time varying signal having a predetermined start time in relation to the sampling of the detector output. In the presently preferred embodiment the RAMP signal is a linearly varying signal, though other signal patterns may be used within the broader aspects of the invention. The existence and amplitude of the detector output signal may therefore be determined by measuring the time delay between the initiation of the RAMP signal and the time at which the LED's 35, 37 are forward biased to generate an output light signal. Once a determinable light signal is generated by the LED's the amplitude of the detector output signal can be determined by reference to the time after start of the RAMP signal. Knowing the function of the RAMP signal readily permits computation of the detector peak output signal.

It is contemplated that the LED's 35, 37 may be constructed to operate at different characteristic wavelengths. In such a manner a plurality of sampling/comparing circuits may generate simultaneous output signals which may be separately discernible by the processing circuitry and wavelength discriminating optical filters. Obviously, the photodetector 39 and other processing circuitry must be constructed to discern optical signals of discrete wavelengths in order to implement such an embodiment.

Figure 2:
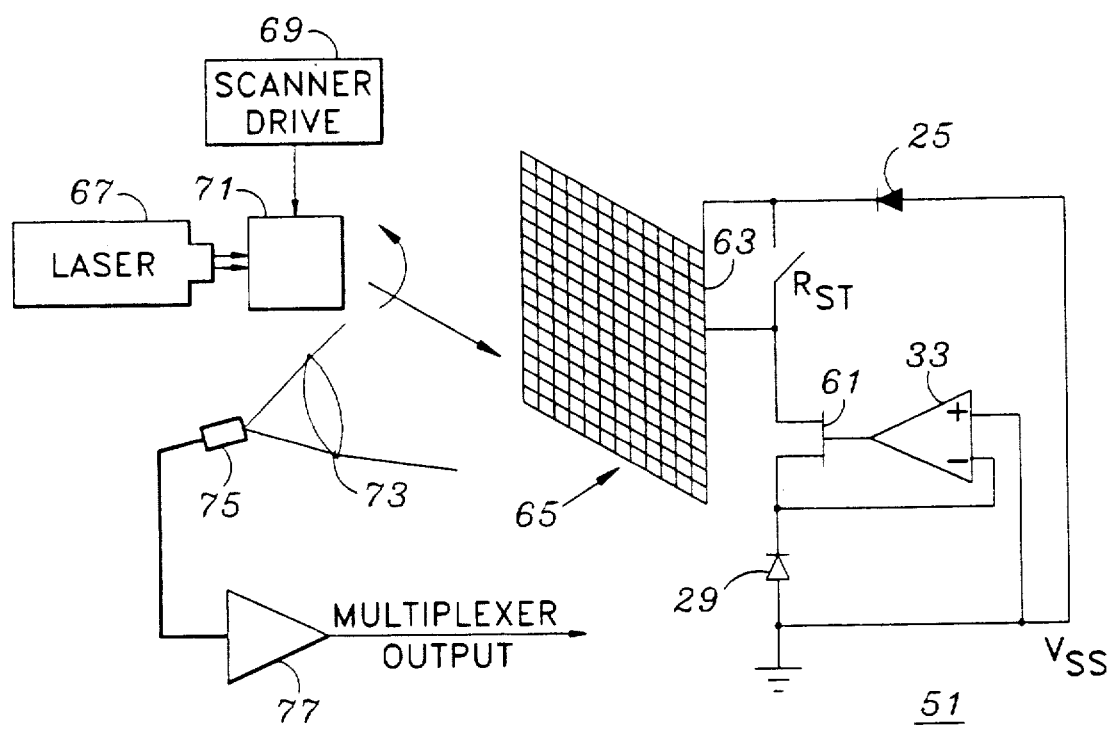
FIG. 2 is a schematic representation of an alternate circuit constructed in accordance with the present invention.

FIG. 2 illustrates an alternate embodiment of the present invention. In the embodiment shown at FIG. 2 the detector input circuit 51 is simplified and requires a lower power to operate. The embodiment shown at FIG. 2 incorporates a modified input circuit 51, shown in conjunction with other system components. As with FIG. 1 the detector element 61 is one of a large number of detector elements that form a detector subarray. The LCD or other display with electronically controlled reflectivity, 63 is also one element in an array of LCD's that have reflectivity producing optical signals representative of the detected input signal. The images on the reflectivity controlled subarray 65 may be scanned by means of laser 67, scanner drive 69 and laser beam scanner 71. Light collecting lens 73 communicates the image generated by laser beam scanning of the LCD array to a photodetector 75. The photodetector output is amplified by amplifier 77 and thereafter communicated to off-focal plane processing circuitry.

The operation of the input circuit 51 is as follows. The signal sensed by the individual detector element 29 is communicated to the associated cell in the array 63. All of the cells of 63 are illuminated by a light source such that the image appearing on the array 63 may be communicated to a corresponding detector element (not shown) connected to the output processing circuit and operating at room temperature. Accordingly, each detector element 29 has a corresponding LCD element 63 as well as a transimpedance element 61, connected to the output processing.

Though the construction set forth at FIG. 2 incorporates additional imaging apparatus other than that set forth at FIG. 1 the economies are such that the cost and technical risks are reduced as a consequence of simplifying the on-focal plane circuitry, which must be designed to operate in a more extreme environment. As a consequence to the reduced consumption of power, the input circuit dissipates less heat and reduces thermal gradience in the input system that degrade the overall detection circuit.

As will be obvious to one of ordinary skill in the art various modifications of the illustrated circuitry may be implemented within the spirit and scope of the present invention. For example, the precise circuitry for sampling and comparing the detector output signal with a reference signal may be modified in accordance with environmental needs and design preferences. Similarly, the manner of electrically and thermally isolating the sampling/comparing circuit from the remaining processing circuit may vary within the scope of the invention.

What is claimed is:

1. A detector interface circuit for coupling infrared detector elements maintained in a cryogenic environment with processing circuitry maintained in an environment characterized by a substantially higher temperature, said interface circuit comprising:
   a first detector input circuit for generation of a first input signal in response to an optical scene, said first detector circuit being disposable in a cryogenic environment along with any associated infrared detector element and electrically connectable to the associated infrared detector element;
   said first detector input circuit being powered by a power source that is electrically and thermally isolated from the processing circuitry;
   said first detector input circuit being operative to communicate said first input signal to the processing circuitry while remaining electrically and thermally isolated from the processing circuitry;
   wherein said first detector input circuit comprises a liquid crystal display that is controllable by an electrical signal for generating an image in response to said first input signal.

2. The circuit as recited in claim 1 further comprising a plurality of said first detector input circuits, each connectable to a dedicated detector element.

3. The circuit as recited in claim 1 wherein the first detector input circuit is operative to receive and store signals generated by the associated detector element.

4. The circuit as recited in claim 3 wherein the first detector input circuit is operative to compare the stored signals to a first reference signal, and to generate said first input signal when a predetermined relationship is established between the stored signal and the reference signal.

5. The circuit as recited in claim 4 wherein said first input signal is an optical signal.

6. The circuit as recited in claim 4 wherein said reference signal is a time varying signal having a start time and wherein the amplitude of the stored signal is represented by the time between said start time and time at which the first input signal is generated.

7. The circuit as recited in claim 5 further comprising photodetector connected to the processing circuitry for communicating said first input signal to the processing circuitry.

8. The circuit as recited in claim 7 further comprising a light power source, said light power source being optically coupled to said first detector input circuit.

9. The circuit as recited in claim 7 further comprising a plurality of first detector input circuits, each being in optical communication with a dedicated photodetector, and wherein each of said first detector circuits is operative to generate a first input signal having a distinct characteristic wavelength, said characteristic wavelengths being identifiable by the processing circuit and optical filters.

10. The circuit as recited in claim 6 wherein said reference signal is generated by a reference signal source that is electrically and thermally isolated from said first detector circuit.

11. The circuit as recited in claim 10 wherein said reference signal is optically communicated from said reference signal source to said first detector input circuit.

12. The circuit as recited in claim 1 wherein said power source comprises a solar cell.

13. The circuit as recited in claim 1 further comprising optics for imaging the output of the liquid crystal upon a photo-type detector element connected to the processing circuitry.

14. The circuit as recited in claim 13 wherein said optics comprises a laser beam scanner.

15. A detector interface circuit for coupling infrared detector elements maintained in a cryogenic environment with processing circuitry maintained in an environment characterized by a substantially higher temperature, said interface circuit comprising:

a first detector input circuit for generation of a first input signal in response to an optical scene, said first detector circuit being disposable in a cryogenic environment along with any associated infrared detector element and electrically connectable to the associated infrared detector element;

said first detector input circuit being powered by a power source that is electrically and thermally isolated from the processing circuitry;

said first detector input circuit being operative to communicate said first input signal to the processing circuitry while remaining electrically and thermally isolated from the processing circuitry; and wherein said first detector input circuit comprises a array of photoreflective cells, said array of cells having a reflectivity that is controllable by an electrical signal for generating an image in response to said first input signal.

16. The circuit as recited in claim 15 further comprising a plurality of said first detector input circuits, each connectable to a dedicated detector element.

17. The circuit as recited in claim 15 wherein the first detector input circuit is operative to receive and store signals generated by the associated detector element.

18. The circuit as recited in claim 17 wherein the first detector input circuit is operative to compare the stored signals to a first reference signal, and to generate said first input signal when a predetermined relationship is established between the stored signal and the reference signal.

19. The circuit as recited in claim 18 wherein said first input signal is an optical signal.

20. The circuit as recited in claim 19 wherein said reference signal is a time varying signal having a start time and wherein the amplitude of the stored signal is represented by the time between said start time and the time at which the first input signal is generated.

21. The circuit as recited in claim 20 wherein said reference signal is generated by a reference signal source that is electrically and thermally isolated from said first detector circuit.

22. The circuit as recited in claim 21 wherein said reference signal is optically communicated from said reference signal source to said first detector input circuit.

23. The circuit as recited in claim 19 further comprising photodetectors connected to the processing circuitry for communicating said first input signal to the processing circuitry.

24. The circuit as recited in claim 23 further comprising a light power source, said light power source being optically coupled to said first detector input circuit.

25. The circuit as recited in claim 23 further comprising a plurality of first detector input circuits, each being in optical communication with a dedicated photodetector, and wherein each of said first detector circuits is operative to generate a first input signal having a distinct characteristic wavelength, said characteristic wavelengths being identifiable by the processing circuitry and optical fibers.

26. The circuit as recited in claim 15 wherein said power source comprises a solar cell.

27. The circuit as recited in claim 16 further comprising optics for imaging the output of the array of photoreflective cells upon a photo-type detector element connected to the processing circuitry.

28. The circuit as recited in claim 16 wherein said optics comprises a laser beam scanner.

* * * * *